(12) United States Patent
Wang et al.

(10) Patent No.: US 10,371,836 B2
(45) Date of Patent: Aug. 6, 2019

(54) DIGITAL POSITRON EMISSION TOMOGRAPHY (DPET) ENERGY CALIBRATION METHOD

(71) Applicant: KONINKLIJKE PHILIPS N.V., Eindhoven (NL)

(72) Inventors: Sharon Xiaorong Wang, Highland Heights, OH (US); Thomas Leroy Laurence, North Royalton, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1243 days.

(21) Appl. No.: 14/405,015

(22) PCT Filed: May 30, 2013

(86) PCT No.: PCT/IB2013/054466
§ 371 (c)(1),
(2) Date: Dec. 2, 2014

(87) PCT Pub. No.: WO2014/001926
PCT Pub. Date: Jan. 3, 2014

(65) Prior Publication Data
US 2015/0160353 A1 Jun. 11, 2015

Related U.S. Application Data

(60) Provisional application No. 61/664,854, filed on Jun. 27, 2012.

(51) Int. Cl.
*G01T 1/29* (2006.01)
*G01T 1/164* (2006.01)
(Continued)

(52) U.S. Cl.
CPC .......... *G01T 1/2985* (2013.01); *G01T 1/1647* (2013.01); *G01T 1/249* (2013.01); *G01T 7/005* (2013.01); *G01T 1/247* (2013.01)

(58) Field of Classification Search
None
See application file for complete search history.

(56) References Cited

U.S. PATENT DOCUMENTS

| 5,345,082 A | 9/1994 | Engdahl et al. |
| 5,508,524 A * | 4/1996 | Goldberg ............. G01T 1/1647 250/363.07 |

(Continued)

FOREIGN PATENT DOCUMENTS

| JP | 8160141 | 6/1996 |
| JP | 9145842 | 6/1997 |

(Continued)

*Primary Examiner* — Gregory J Toatley, Jr.
*Assistant Examiner* — Brandon J Becker

(57) ABSTRACT

A system (10) and method for energy correction of positron emission tomography (PET) event data by at least one processor. Event data for a plurality of strike events corresponding to gamma events is received. Each strike event is detected by a pixel of a detector module (50) and includes an energy and a time. The energy of the strike events is linearized using an energy linearity correction model including one or more parameters. Clusters of the strike events are identified based on the times of the strike events, and sub-clusters of the clusters are identified based on the pixels corresponding to the strike events of the clusters. Energies of the sub-clusters are corrected using a first set of correction factors, and energies of clusters including a plurality of sub-clusters are corrected using a second set of correction factors.

20 Claims, 11 Drawing Sheets

(51) Int. Cl.
*G01T 7/00* (2006.01)
*G01T 1/24* (2006.01)

(56) References Cited

U.S. PATENT DOCUMENTS

| | | | | |
|---|---|---|---|---|
| 5,677,536 A | * | 10/1997 | Vickers | G01T 1/1642 250/252.1 |
| 5,825,033 A | * | 10/1998 | Barrett | H01L 27/14658 250/370.09 |
| 5,841,140 A | * | 11/1998 | McCroskey | G01T 1/1642 250/363.03 |
| 6,410,919 B1 | | 6/2002 | Nickles | |
| 7,342,231 B2 | | 3/2008 | Warburton et al. | |
| 8,080,780 B2 | | 12/2011 | Burr et al. | |
| 2003/0057375 A1 | | 3/2003 | Williams et al. | |
| 2006/0113479 A1 | | 6/2006 | Zavarzin | |
| 2008/0277587 A1 | * | 11/2008 | Case | G01T 1/1642 250/363.07 |
| 2009/0072156 A1 | * | 3/2009 | Chinn | G01T 1/2985 250/363.04 |
| 2009/0200474 A1 | * | 8/2009 | Boisvert | G01T 1/2985 250/369 |
| 2009/0257633 A1 | * | 10/2009 | Cook | A61B 6/037 382/131 |
| 2011/0216953 A1 | * | 9/2011 | Callahan | G06K 9/00 382/128 |
| 2011/0235775 A1 | * | 9/2011 | Tada | A61B 6/00 378/36 |

FOREIGN PATENT DOCUMENTS

| | | |
|---|---|---|
| JP | 2005043104 | 2/2005 |
| JP | 2010-160045 | 7/2010 |
| JP | 2010160045 | 7/2010 |
| WO | 03001243 A2 | 1/2003 |
| WO | 2005069040 A1 | 7/2005 |
| WO | 2010041192 A2 | 4/2010 |
| WO | 2010067220 A2 | 6/2010 |

* cited by examiner

DIGITAL POSITRON EMISSION TOMOGRAPHY (DPET) ENERGY CALIBRATION METHOD

CROSS REFERENCE TO RELATED APPLICATIONS

This application is a national filing of PCT application Serial No. PCT/IB2013/054466, filed May 30, 2013, published as WO 2014/001926 A1 on Jan. 3, 2014, which claims the benefit of U.S. provisional application Ser. No. 61/664,854 filed Jun. 27, 2012, which is incorporated herein by reference.

The present application relates generally to positron emission tomography (PET). It finds particular application in conjunction with energy calibration of a digital PET (DPET) detector and will be described with particular reference thereto. However, it is to be understood that it also finds application in other usage scenarios and is not necessarily limited to the aforementioned application.

One specification of PET detectors is energy resolution, which characterizes how well a detector rejects scatter events. The better the scatter rejection capability of a detector, the higher the contrast of the generated images. Energy resolution can be more important for DPET detectors than analog PET detectors, when DPET performs quantitative analysis of a treatment's effectiveness over time. A smaller energy resolution helps to keep scatter events away from the true activity distribution and, therefore, improves the accuracy of standardized uptake value (SUV).

Calibration of DPET detectors is important to improving energy resolution. One challenge to energy resolution in DPET detectors is non-linearity in the photon counts, which is due to the photodiode reset mechanisms of DPET detectors. The current method of calibrating a DPET detector corrects this non-linearity using a single logarithmic model. However, this presents at least two problems. The individual pixels need different corrections, such that the logarithmic model performs poorly for all pixels. Further, the logarithmic model over corrects the energy level from the 100 keV to 500 keV range, which is important for clustering.

After correcting nonlinearity, the current method of calibrating a DPET detector measures the centroid of the pulse height spectrum of a calibration source, such as Na22. It then takes the ratio of the measured centroid to the ideal centroid and multiplies the ratio to every gamma event as a scaling factor. This works well for non-scatter gamma events, such as gamma events captured by a single crystal. However, the correction coefficient doesn't work well for scatter events and the energy resolution becomes less precise.

The present application provides a new and improved system and method which overcome the above-referenced problems and others.

In accordance with one aspect, a system for energy correction of positron emission tomography (PET) event data is provided. The system includes at least one energy correction processor programmed to receive event data for a plurality of strike events corresponding to gamma events. Each strike event is detected by a pixel of a detector module and includes an energy and a time. The energy of the strike events is linearized using an energy linearity correction model including one or more parameters. Clusters of the strike events are identified based on the times of the strike events, and sub-clusters of the clusters are identified based on the pixels corresponding to the strike events of the clusters. Energies of the sub-clusters are corrected using a first set of correction factors, and energies of clusters including a plurality of sub-clusters are corrected using a second set of correction factors.

In accordance with one aspect, a method for energy correction of positron emission tomography (PET) event data is provided. The method is performed by at least one processor and includes receiving event data for a plurality of strike events corresponding to gamma events. Each strike event is detected by a pixel of a detector module and includes an energy and a time. The energy of the strike events is linearized using an energy linearity correction model including one or more parameters. Clusters of the strike events are identified based on the times of the strike events, and sub-clusters of the clusters are identified based on the pixels corresponding to the strike events of the clusters. Energies of the sub-clusters are corrected using a first set of correction factors, and energies of clusters including a plurality of sub-clusters are corrected using a second set of correction factors.

In accordance with another aspect, a system for energy correction of positron emission tomography (PET) event data is provided. The system includes at least one energy processor programmed to receive event data for a plurality of strike events corresponding to gamma events. Each strike event is detected by a pixel of a detector module and includes an energy and a time. The energy of the strike events is linearized between about 100 keV and about 500 keV using an energy linearity correction model. Clusters of the strike events are identified based on the times of the strike events, and energies of the identified clusters are corrected using a plurality of levels of correction factors. The corrected energies of the strike events of a common cluster are combined, and the combined corrected energies are compared with a preselected threshold.

One advantage resides in improved energy resolution of digital positron emission tomography detectors.

Another advantage resides in higher contrast images.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
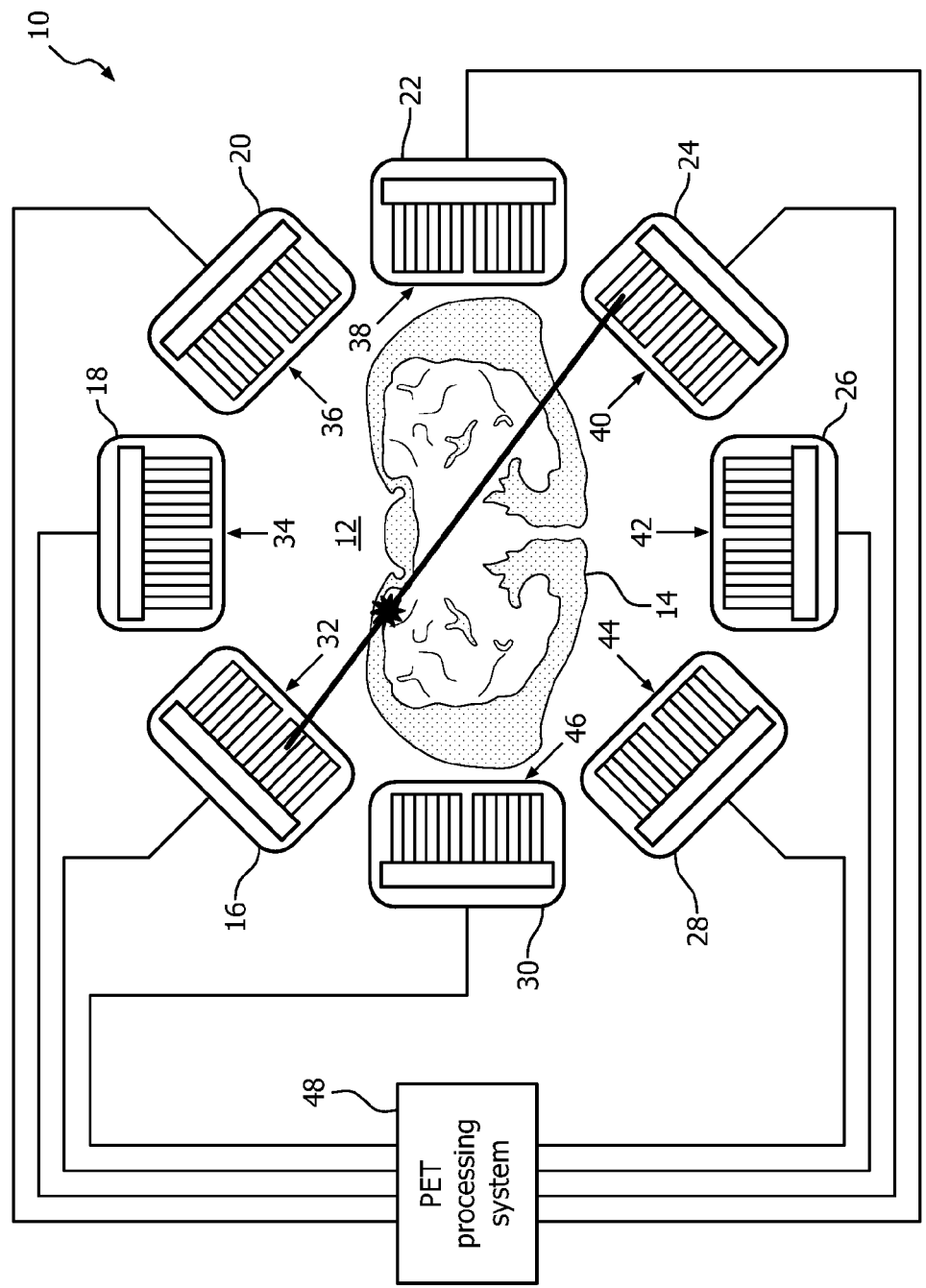
FIG. 1 illustrates a positron emission tomography (PET) system employing solid state detector modules.

With reference to FIG. 1, a positron emission tomography (PET) system 10 includes an imaging volume 12 for receiving a region of interest (ROI) 14 of a patient to image. Further, the PET system 10 can include a patient support (not shown), such as a patient bed, to support the patient and/or position the ROI 14 in the imaging volume 12. Examples of the ROI 14 include, but are not limited to, hearts, brains, thyroids, bones, joints, ligaments, tendons, muscles, nerves, kidneys, lungs, tumors, lesions, and so on.

The PET system 10 further includes a plurality of solid state detector modules 16, 18, 20, 22, 24, 26, 28, 30 (e.g., solid state detector modules) arranged, typically in a circle, around the imaging volume 12. The detector modules 16, 18, 20, 22, 24, 26, 28, 30 include receiving faces 32, 34, 36, 38, 40, 42, 44, 46 for receiving gamma photons from the imaging volume 12. In response to receiving gamma photons, the detector modules generate event data for the gamma events, which is provided to a PET processing system 48 of the PET system 10. As illustrated a pair of gamma photons are emitted from the ROI 14 and strike a first detector module 16 and a second detector module 24 near simultaneously (i.e., coincidentally).

Figure 2:
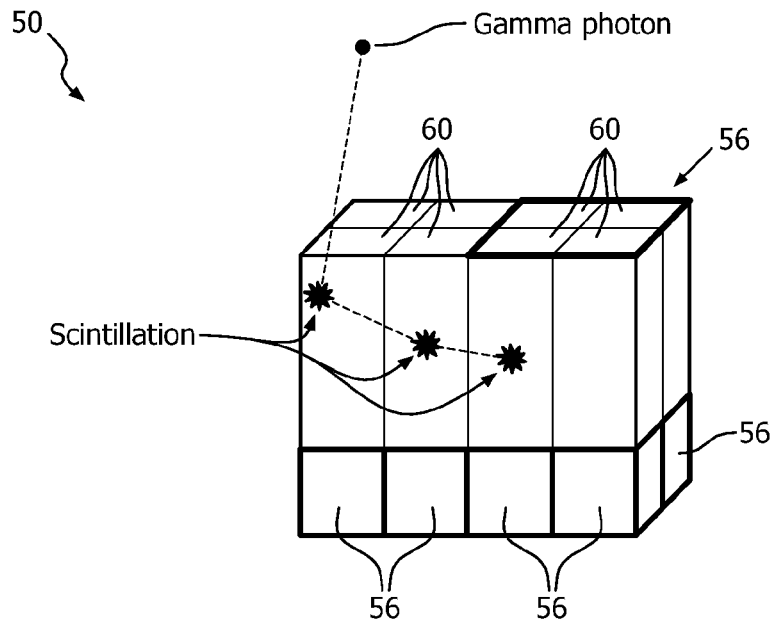
FIG. 2 illustrates a detector module.

With reference to FIG. 2, each 50 of the detector modules 16, 18, 20, 22, 24, 26, 28, 30 includes a plurality of radiation sensitive elements, such as a radiation sensitive element 52, defining a pixelated detection grid 54. The radiation sensitive elements detect corresponding photon strikes, including the energies of the photon strikes, and each corresponds to a pixel of the pixelated detection grid 54. The pixelated detection grid 54 can be subdivided into a plurality of non-overlapping blocks, such as block 56, each block comprised of a grouping of pixels, such as a 2×2 grouping of pixels. Examples of radiation sensitive elements include digital or analog silicon photomultipliers (SiPMs), photodiodes, and other opto-electric transducers. However, direct photon to electrical converters (a.k.a., semiconductor gamma detectors), such as semiconductor crystals, zinc-cadmium telluride (CZT) elements, and the like, are also contemplated.

The radiation sensitive elements typically detect one of gamma photons and visible-light photons. Insofar as the radiation sensitive elements detect gamma photons, the pixelated detection grid 54 typically defines the receiving face of the detector module 50. However, insofar as the radiation sensitive elements 52 detect visible-light photons, the detector module 50 includes one or more scintillator elements, such as scintillator elements 60, which typically define the receiving face of the detector module 50. The scintillator elements convert gamma photons to visible-light photons and are optically coupled with the radiation sensitive elements. Typically, the scintillator elements are optically correlated in a 1:1 ratio with the radiation sensitive elements. When struck by a gamma photon, the gamma photon gives up energy to the scintillator element and the scintillator elements emits visible-light photons toward the detection grid 54. Examples of scintillation elements include scintillator plates (e.g., sodium iodide crystals), individual scintillation or pixelated crystals (e.g., LYSO, LSO, etc.), and the like.

The detector module 50 uses the radiation sensitive elements to create event data for gamma events. A gamma event corresponds to the receipt of a gamma photon and is typically one of a scatter event and a non-scatter event. Where the detector module 50 includes the scintillator elements, a non-scatter event is typically a gamma event captured completely by a single scintillator element and a scatter event is typically a gamma event captured by a plurality scintillator elements. The event data for the gamma events describes the corresponding strike events detected by the radiation sensitive elements. The event data for each strike event suitably identifies the location, time, and energy of the corresponding photon strikes.

More specifically, when the gamma photon strikes a scintillator element, it may be scattered or deflected. The change in trajectory is defined by the scatter or Compton angle. The amount of energy deposited in the scintillator element is proportional to the Compton angle, and the amount of energy deposited is directly correlated to the amount or energy of light created by the scintillation. In the example of FIG. 2, the gamma photon is scattered in two scintillator elements before finally depositing the remainder of its energy in a third scintillator element causing three scintillations in three different scintillator elements.

Figure 3:
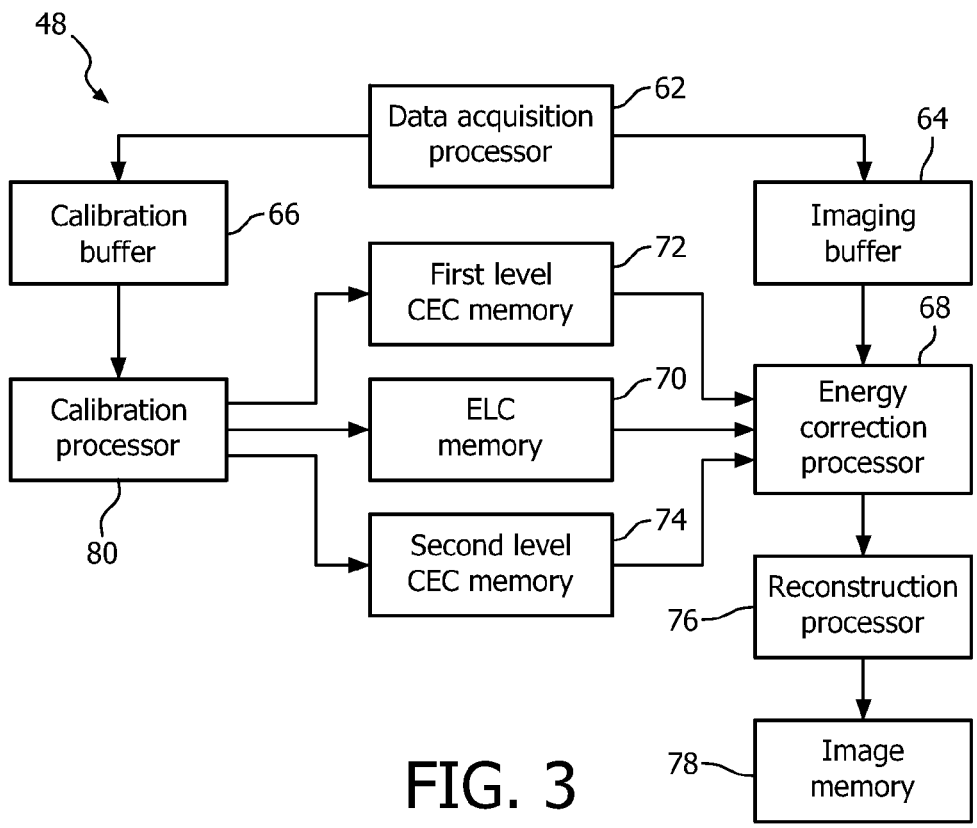
FIG. 3 illustrates a PET processing system.

Referring to FIG. 3, the PET processing system 48 includes a data acquisition processor 62. The data acquisition processor 62 acquires event data from the detector modules 16, 18, 20, 22, 24, 26, 28, 30 over a data acquisition period of a predetermined length, such as 15 minutes. The event data includes event data for all the strike events detected by the detector modules 16, 18, 20, 22, 24, 26, 28, 30 during the data acquisition period, where the event data for each of the strike events identifies the detector pixel or element 52, the energy, and the time of the event. The data acquisition processor 62 can be employed for acquiring event data for imaging the ROI 14 and/or for acquiring event data for calibration of the detector modules 16, 18, 20, 22, 24, 26, 28, 30.

If the data acquisition processor 62 is being employed for imaging the ROI 14, the data acquisition processor 62 acquires event data for gamma photons emitted from the ROI 14 and stores the acquired event data in an imaging buffer 64. In preparing for the acquisition, the ROI 14 is injected with one or more radioisotopes. Examples of such radioisotopes include, but are not limited to, Tc-99m, I-131, Ga-67, and In-111. The radioisotopes can be combined and injected with radioligands to create a radiopharceutical that binds to or is preferentially absorbed by specific types of tissue. Further, the ROI 14 is positioned in the imaging volume 12. For example, the patient is positioned on the patient support and the patient support moves the ROI 14 into the imaging volume 12.

If the data acquisition processor 62 is being employed for calibration of the detector modules 16, 18, 20, 22, 24, 26, 28, 30, the data acquisition processor 62 acquires, for each of one or more calibration sources, event data for gamma photons emitted from the calibration source and stores the acquired event data in a calibration buffer 66. Typically, the calibration sources include a plurality of calibration sources, such as Na22 and Co57 calibration sources. Further, the calibration sources include one or more known energy peaks, such as 511 keV, and typically include a plurality of known energy peaks spanning from about 100 keV to about 500 keV, such as 122 keV, 511 keV and 1275 keV. An energy peak of a calibration source is a peak on a pulse height spectrum of the calibration source.

The calibration sources are typically spherically shaped to irradiate all detector elements equally. Examples of calibration sources that can be employed include Na22, Co57, Tc, Na17, and other sources emitting gamma photons. In preparing for the acquisition for one of the calibration sources, the calibration source is positioned within the imaging volume 12, typically in the center of the imaging volume 12.

An energy correction processor 68 of the PET processing system 48 processes event data acquired by the data acquisition processor 62 for imaging the ROI 14. The event data is typically received via the imaging buffer 64. This processing includes performing energy linearity correction (ELC) on the event data. ELC is important for clustering, which adds the energies of strike events of a detector in a given, very short time period, and then judges if the energy is substantially 511 keV or not. Adding the energies is accurate if the energies fall into a linear scale. Clustering is especially important for detector scatter events in which energy of the gamma photon is deposited in a plurality of the scintillator element of the detector element, which account for about 30% of all gamma events. However, known methods of ELC are typically inadequate to compensate accurately for this non-linearity.

Figure 4:
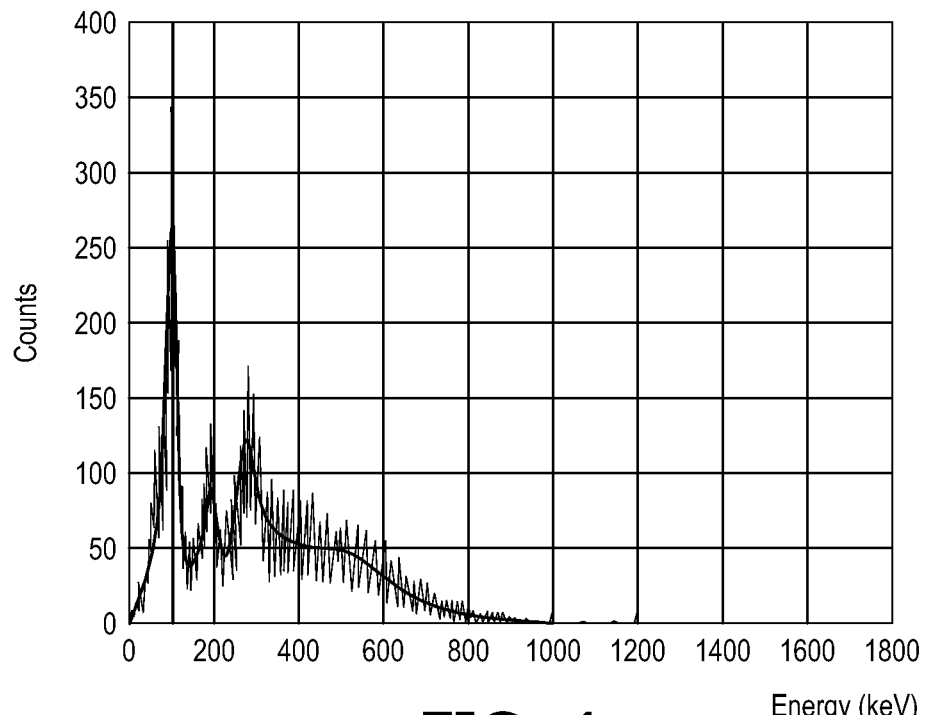
FIG. 4 illustrates a pulse height spectrum of a Co57 calibration source.
Figure 5:
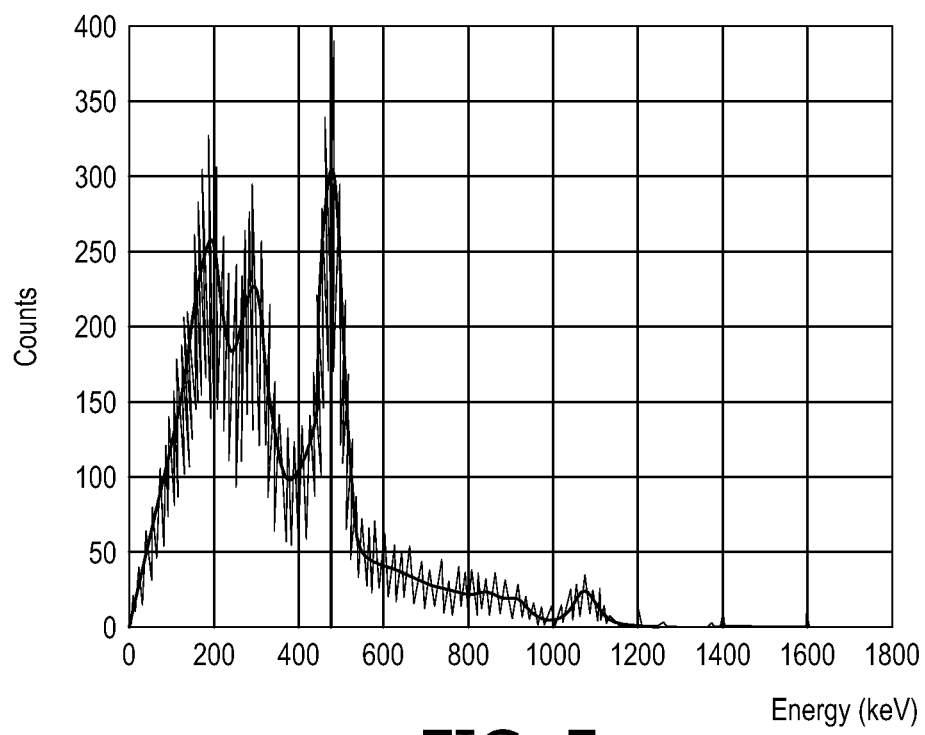
FIG. 5 illustrates a pulse height spectrum of a Na22 calibration source.

To illustrate, attention is directed to FIGS. 4 and 5. FIG. 4 illustrates a pulse height spectrum acquired using a Co57 calibration source, which has a known energy peak of 122 keV, and FIG. 5 illustrates a pulse height spectrum acquired using a Na22 calibration source, which has known energy peaks of 511 keV and 1275 keV. Without ELC, the measured energy peaks corresponding to the known energy peaks of 122 keV, 511 keV and 1275 keV are 118 keV, 489 keV and 1164 keV, respectively.

Known methods of ELC typically use the following logarithmic model:

$$P = -A\log_{10}\left(1 - \frac{P_0}{A}\right) \quad (1)$$

where $P_0$ is the detected energy, P is the real energy, and A is the number of active cells. Correcting the energy fo the actually measured energy peaks for 122 keV, 511 keV, and 1275 keV gamma photons using this function, the corrected energy peaks become 130 keV, 518 keV, and 1261 keV. However, while the corrected energy peaks are closer to the known energy peaks of the gamma photons, the error is still high. Further, the non-linearity cannot be corrected using a single multiplier since the ratios of the corrected energy peaks and the known energies differ. For example, $$\frac{130 \text{ keV}}{122 \text{ keV}} = 1.06 \text{ and } \frac{518 \text{ keV}}{511 \text{ keV}} = 1.01.$$

To address the inadequancies of known methods of ELC, the following logarithmic model is employed for ELC:

$$P = -k_1 A\log_{10}\left(1 - \left(k_2 \frac{P_0}{A}\right)^{k_3}\right) \quad (2)$$

where $k_1$, $k_2$, and $k_3$ are parameters, $P_0$ is the detected energy, P is the real energy, and A is the number of active cells.

Figure 6:
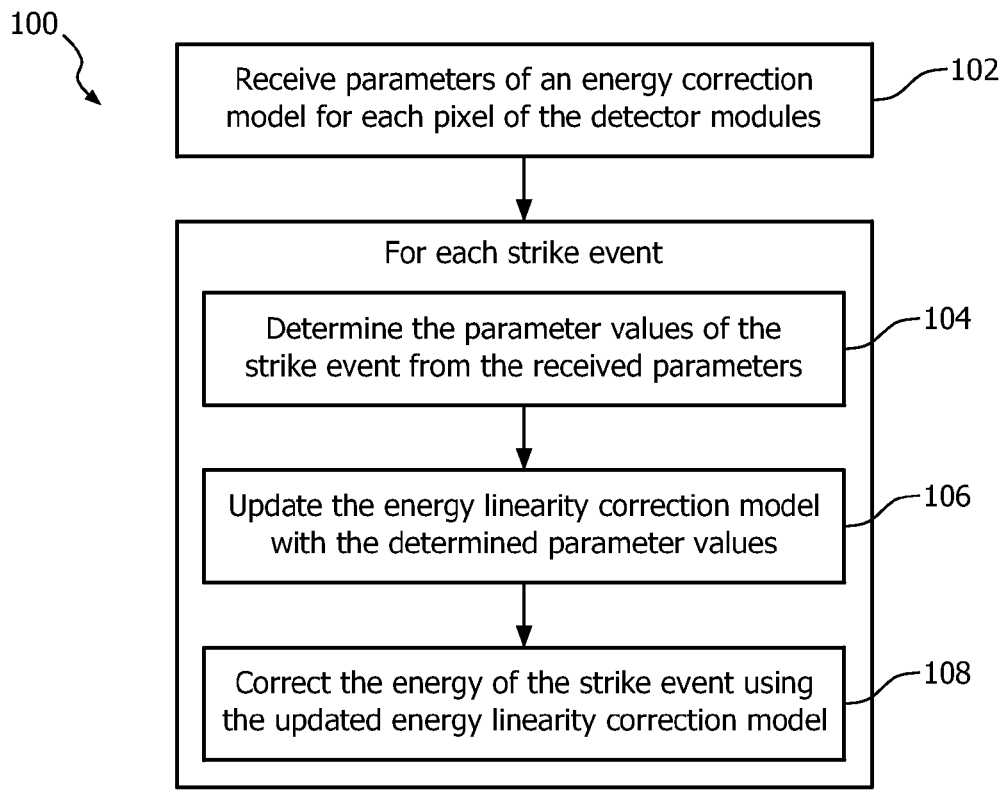
FIG. 6 illustrates a method for energy linearity correction of strike events.

With reference to FIG. 6, a method 100 for ELC of strike events is provided. The method 100 is performed by the energy correction processor 68 and uses an ELC model, such as the logarithmic model of Equation (2), including one or more parameters. The ELC model takes a detected energy as input and outputs a corrected energy.

The method 100 includes receiving 102 parameter values corresponding to the parameters of the ELC model for each pixel of the detector modules 16, 18, 20, 22, 24, 26, 28, 30, typically from an ELC memory 70 of the PET processing system 48. The parameter values are determined during calibration of the PET system 10. The parameter values can be received by, for example, receiving an ELC look-up table (LUT) for each of the detector modules 16, 18, 20, 22, 24, 26, 28, 30, where the ELC LUT is indexed based on the detector pixel and the detector module and includes parameter values for each pixel of the detector module. For each strike event, the parameter values of the strike event are determined 104. For example, the parameter values of the strike event are looked up in the ELC LUT corresponding to the detector module of the strike event based on the pixel of the strike event. The ELC model is then updated 106 with the determined parameter values and the energy of the strike event is corrected 108 using the updated ELC model.

After ELC of the event data, the energy correction processor 68 identifies clusters of strike or scintillation events from the event data using the times of the strike events. A cluster looks to identify the strike or scintillation events resulting from a single gamma photon by looking to the strike events occurring temporally proximate to one another and detected by the same detector module 50. Further, the energy correction processor 68 identifies sub-clusters of strike events from the clusters based on the detector pixels or detection elements 52 corresponding to the strike events. A sub-cluster is a grouping of one or more strike events of a cluster corresponding to the block of detector pixels 56, such as a 2×2 block of pixels. As described above, blocks 56 are subdivisions of the pixelated detection grids 54 of the detector modules 16, 18, 20, 22, 24, 26, 28, 30; 50. Any number of well known techniques can be employed to identify the clusters and sub-clusters.

For example, the gamma photon is traveling at the speed of light. Based on the relative locations of the detector elements 52 that detect energy and the time between detections, the detected events can be screened for detector events that could have resulted from a common gamma photon.

Figure 7:
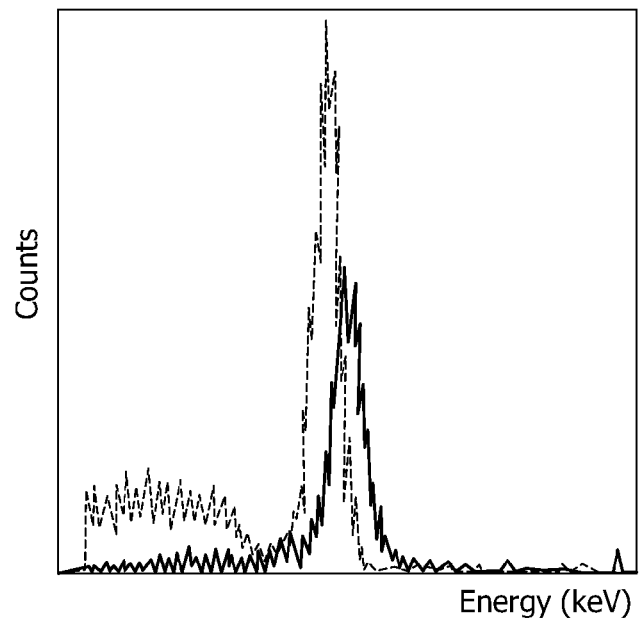
FIG. 7 illustrates the pulse height spectra of non-scatter events and scatter events.

Using the identified clusters and sub-clusters, the energy correction processor 68 performs clustering energy correction (CEC). CEC is important to correct for differences between the energy peaks of non-scatter events and scatter events. The non-scatter events are typically captured by a single scintillator element and scatter events are typically captured by a plurality of scintillator elements. Generating the pulse height spectra of non-scatter events and scatter events separately, as illustrated in FIG. 7, the difference in energy peaks can be seen.

Figure 8:
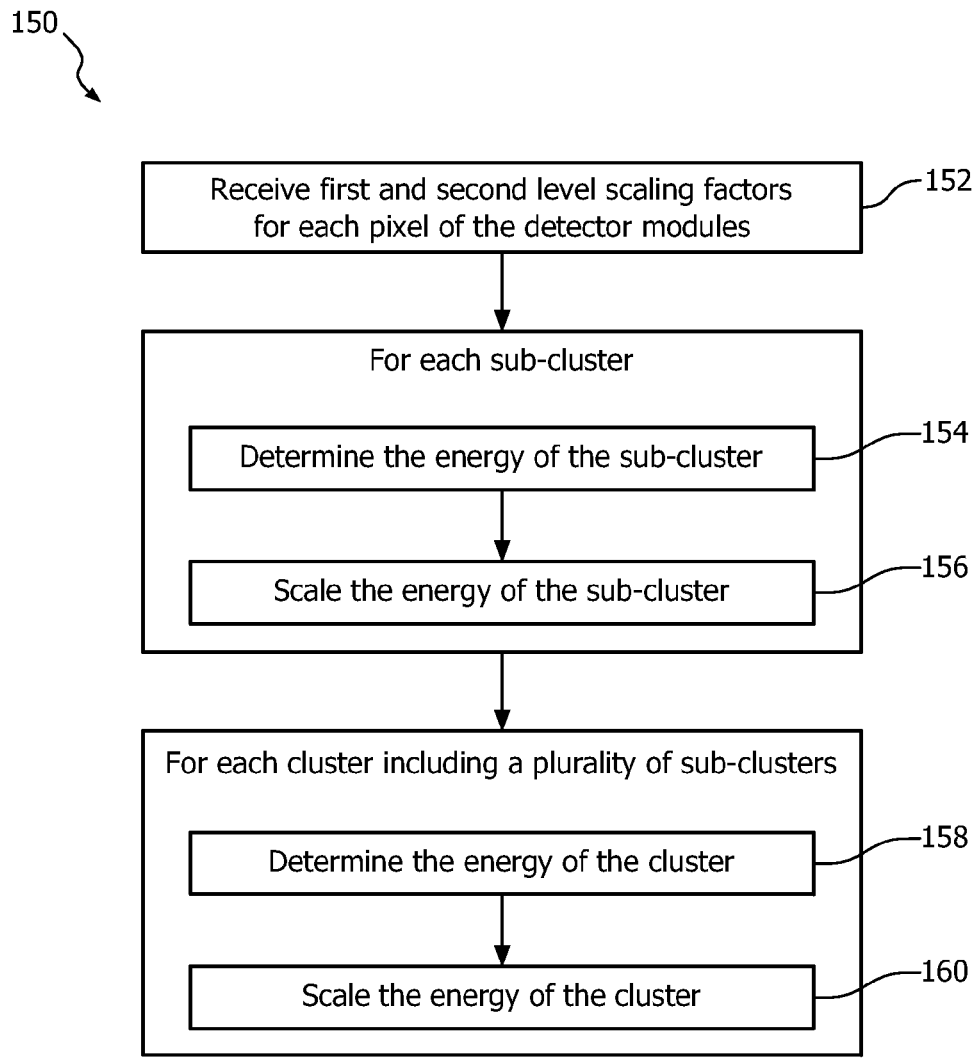
FIG. 8 illustrates a method for clustering energy correction.

With reference to FIG. 8, a method 150 for CEC is provided. The method 150 is performed by the energy correction processor 68 and is typically performed using two levels of energy correction. However, those skilled in the art will appreciate that additional levels of energy correction can be employed. The first level of energy correction corrects the energy of sub-clusters of the clusters, and the second level of energy correction corrects the energy of clusters as determined from the energy of the corrected the sub-clusters.

The method 150 includes receiving 152 first and second level scaling factors for each pixel of the detector module 50, typically from first and second level CEC memories 72, 74, respectively, of the PET processing system 48. The scaling factors are determined during calibration of the PET system 10, as described below, and can be received by, for example, receiving first and second level CEC LUTs for each of the detector modules 16, 18, 20, 22, 24, 26, 28, 30, where the first and second CEC LUTs are indexed based on pixel of the detector module and include first and second level scaling factors, respectively, for each pixel of the detector module.

For each sub-cluster, the energy of the sub-cluster is determined 154 by summing the energies of the strike events of the sub-cluster, as shown below:

$$E_j = \sum_{i=1}^{n} e_i \tag{3}$$

where $E_j$ is the energy of sub-cluster j, $e_i$ is the energy of strike event i of sub-cluster j, and n is the number of strike events of sub-cluster j. The position of the received gamma photon corresponding to sub-cluster j on the receiving face of the detector module corresponding to sub-cluster j can be estimated as follows:

$$x_j = \frac{\sum_{i=1}^{n} e_i x_i}{E_j} \tag{4}$$

$$y_j = \frac{\sum_{i=1}^{n} e_i y_i}{E_j} \tag{5}$$

where $x_i$ and $y_i$ are the x and y positions, respectively, of the detector pixel corresponding to strike event i.

After determining the energy of the sub-cluster, the energy is scaled 156 using the first level scaling factors. This includes determining the main strike event of the sub-cluster by analyzing the energies of the strike events of the sub-cluster. The main strike event is the strike event with the greatest energy. After determining the main strike event, the first level scaling factor is determined based on the pixel of the main strike event. For example, the first level scaling factor is looked up in the first level CEC LUT corresponding to the detector module of the main strike event based on the pixel of the main strike event. The first level scaling factor is then applied to the energy of the sub-cluster as follows:

$$E'_j = E_j \times \alpha \tag{6}$$

where $E'_j$ is the corrected energy of sub-cluster j, $E_j$ is the original energy of sub-cluster j and $\alpha$ is the scaling factor.

For each cluster including only a single sub-cluster, the energy of the cluster is the energy of the sub-cluster. However, for each cluster including a plurality of sub-clusters, the energy of the cluster is determined 158 by summing the energies of the sub-clusters, as shown below:

$$E_k^c = \sum_{j=1}^{m} E_j \tag{7}$$

where $E_k^c$ is the energy of cluster k, $E_j$ is the energy of sub-cluster j of cluster k, and m is the number of sub-clusters of cluster k. The position of the received gamma photon corresponding to cluster k on the receiving face of the detector module 50 corresponding to cluster k can be estimated as follows:

$$x_k = \frac{\sum_{j=1}^{m} E_j x_j}{E_k^c} \tag{8}$$

$$y_k = \frac{\sum_{j=1}^{m} E_j y_j}{E_k^c} \tag{9}$$

where $x_j$ and $y_j$ are the x and y positions, respectively, of the block corresponding to sub-cluster j.

After determining the energy of the cluster, the energy is scaled 160 using the second level scaling factors. This includes determining the main strike event of the cluster by analyzing the energies of the strike events of the cluster. As above, the main strike event is the strike event with the greatest energy. After determining the main strike event, the second level scaling factor is determined based on the pixel of the main strike event. For example, the second level scaling factor is looked up in the second level CEC LUT corresponding to the detector module of the main strike event based on the pixel of the main strike event. The second level scaling factor is then applied to the energy of the cluster as follows:

$$E_k^{C'} = E_k^C \times \beta \tag{10}$$

where $E_k^{C'}$ is the corrected energy of cluster k, $E_k^C$ is the original energy of cluster k and $\beta$ is the scaling factor.

Figure 9A:
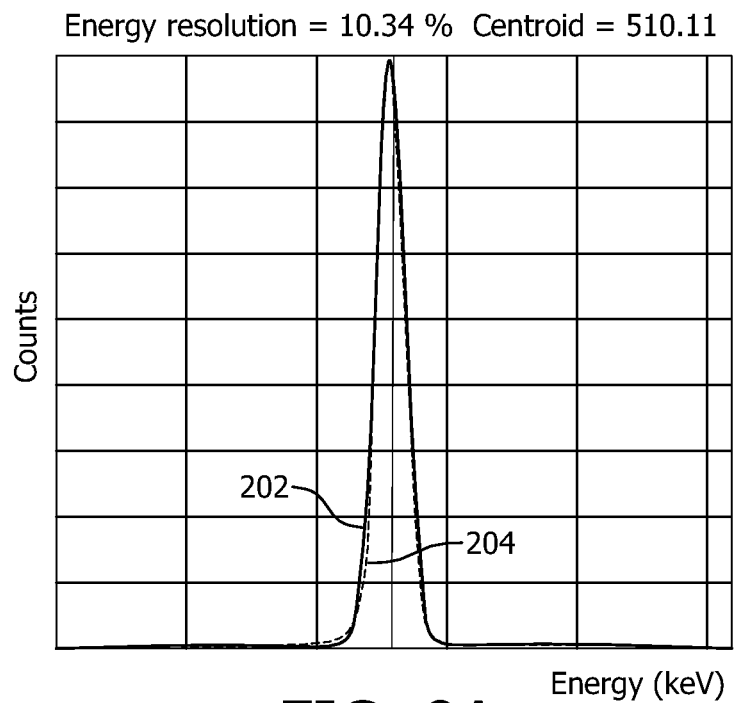
FIG. 9A illustrates the energy resolution of a PET system after energy correction.
Figure 9B:
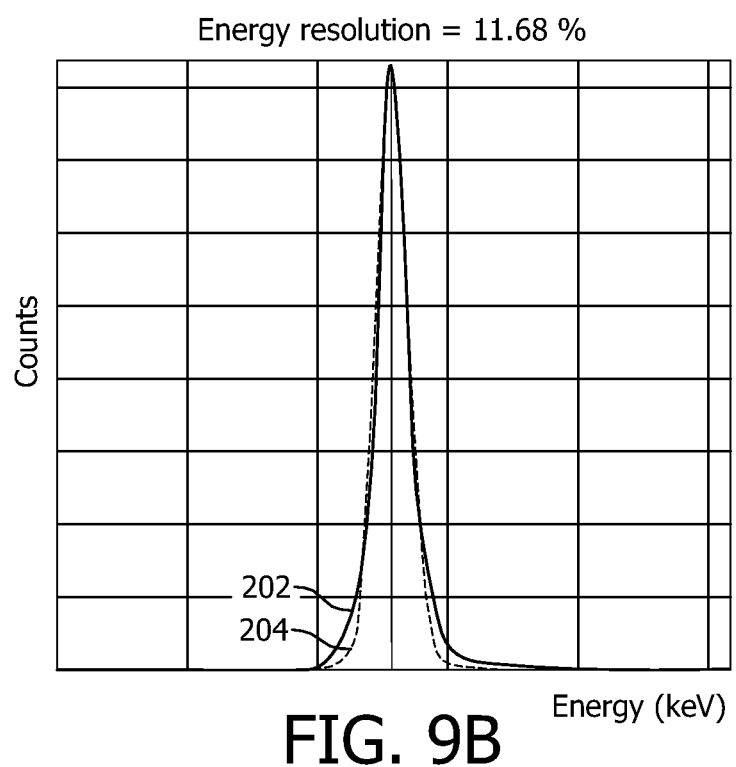
FIG. 9B illustrates the energy resolution of a PET system before energy correction.

Advantageously, applying both the ELC and the CEC improves the energy resolution of the PET system 10. Referring to FIGS. 9A and 9B, the energy resolution of the PET system 10 before energy correction and after energy correction is illustrated. FIG. 9A illustrates the energy resolution after energy correction, and FIG. 9B illustrates the energy resolution before energy correction. Further, without energy correction, the energy spectrum is incorrect. This can be seen through comparison of the measured energy curve 202 with a fit Gaussian curve 204. The measured energy curve 202 before energy correction has a wider tail outside of the fit Gaussian curve 204.

Referring back to FIG. 3, a reconstruction processor 76 of the PET processing system 48 processes the energy corrected event data to generate an image representation of the ROI 14. This includes filtering invalid gamma events, such as gamma events with energies other than 511 keV, pairing gamma events based on time to define line of responses (LORs), and reconstructing the LORs into the image representation. As to filtering invalid gamma events, the energy corrected clusters are compared with an energy threshold to determine if the events are valid and can be used for reconstruction. In a PET scanner, only clusters and non-scatter events are used in reconstruction. The rest are discarded. The image representation is then stored in a image memory 78 of the PET processing system 48 for subsequent use. For example, the image representation can be employed by a video processor and/or displayed on a display.

A calibration processor 80 of the PET processing system 48 processes event data acquired by the data acquisition processor 62 for calibration to calibrate the detector modules 16, 18, 20, 22, 24, 26, 28, 30. The event data is typically received via the calibration buffer 66. This processing includes determining the parameter values of the ELC model, the first level scaling factors and the second level scaling factors, for each pixel of the detector modules. As noted above, scaling factors for additional levels can be determined as well. Suitably, the parameter values, the first level scaling factors and the second level scaling factors are generated from event data acquired during different data acquisition periods.

Figure 10:
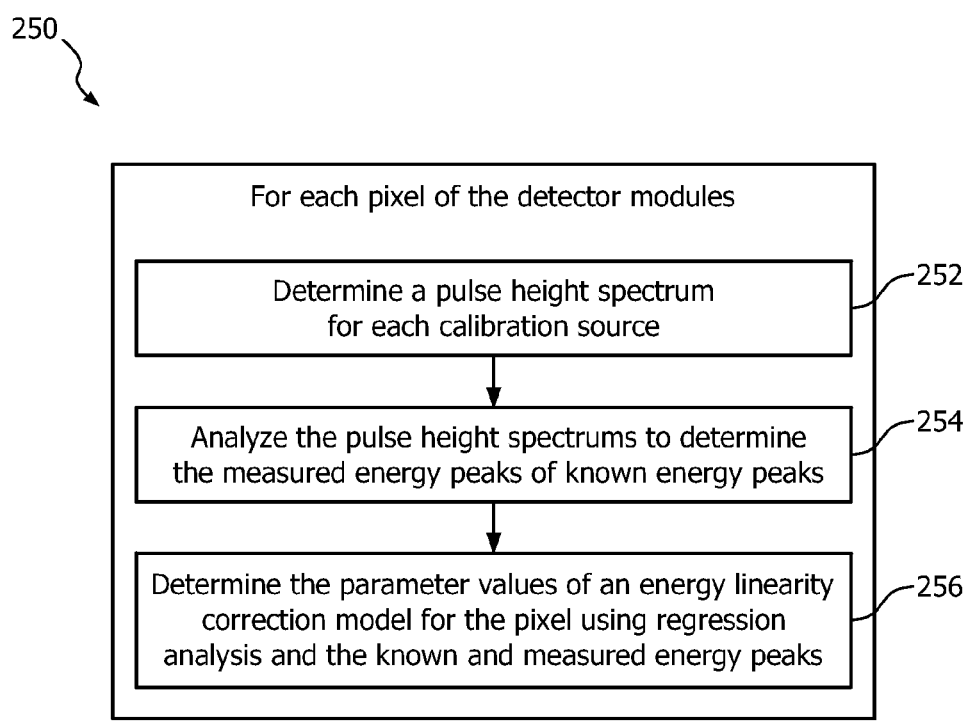
FIG. 10 illustrates a method for determining parameter values of an energy linearity correction model.

With reference to FIG. 10, a method 250 for determining parameter values of the ELC model is provided. The method 250 is performed by the calibration processor 80 and uses the ELC model, such as the logarithmic model of Equation (2). The method 250 includes, for each pixel of the detector modules 16, 18, 20, 22, 24, 26, 28, 30, determining 252 a pulse height spectrum of the pixel from the event data for each calibration source. The pulse height spectrums of the pixel are then analyzed 254 to determine the measured energy peaks of one or more known energy peaks, such as 122 keV, 511 keV, and 1275 keV, of the calibration sources. The measured energy peak of a known energy peak can be determined by searching for an energy peak proximate the known energy peak, such as within the range of +/−15 keV of the known energy peak.

After determining the measured energy peaks from the pulse height spectrums, the parameter values of the energy linearization model are determined 256 for the pixel using the measured energy peaks. This includes optimizing the parameters using a regression analysis, and the known and measured energy peaks, so that the errors of the output energy P is smallest in the least square sense for the energy peaks. For example, parameters of the model of Equation (2) can be optimized, for example, for the energy peaks of 122 keV, 511 keV, and 1275 keV. Suitably, the number of known energy peaks is greater than or equal to the number of parameters $k_1$, $k_2$, and $k_3$ of the ELC model of Equation (2).

Figure 11:
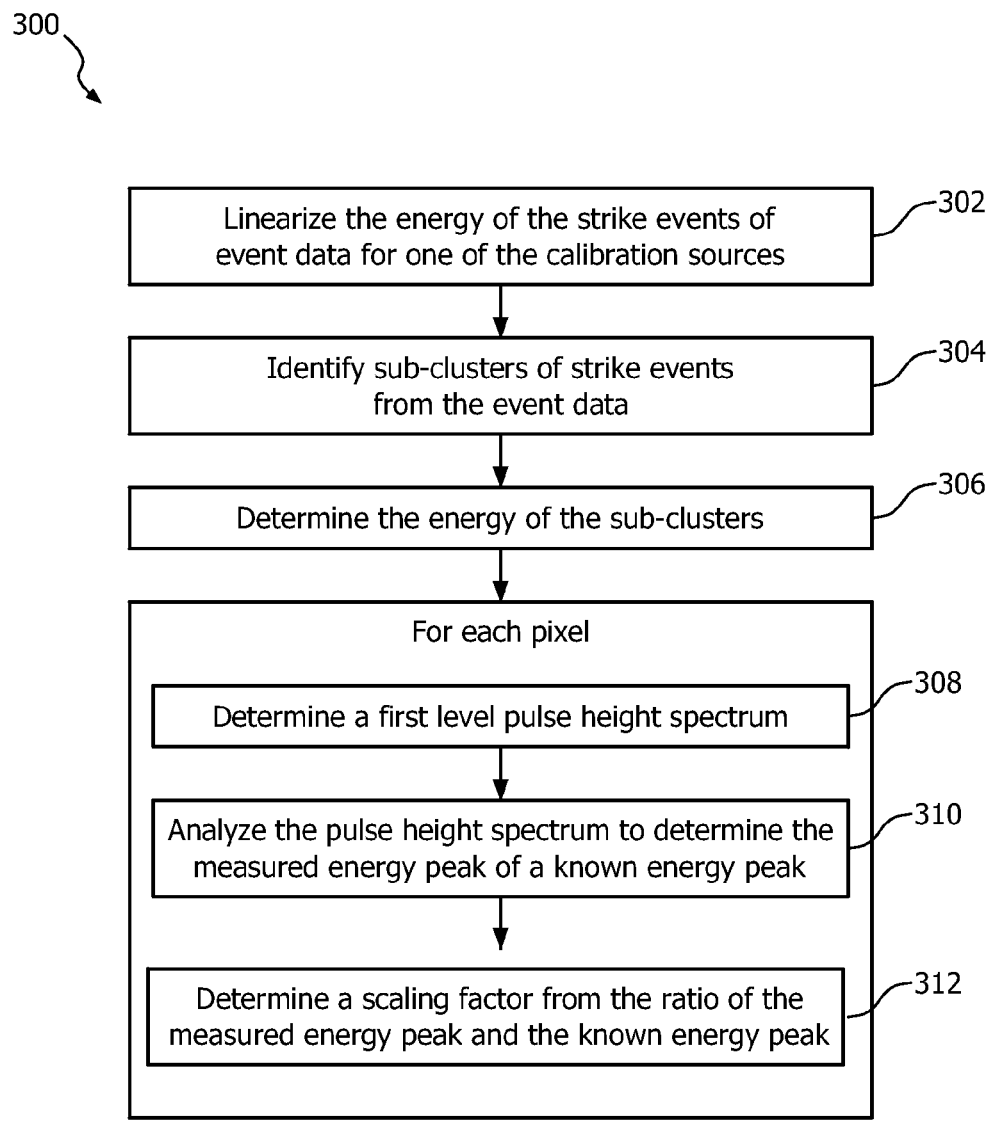
FIG. 11 illustrates a method for determining first level scaling factors.

With reference to FIG. 11, a method 300 for determining first level scaling factors is provided. The method 300 is performed by the calibration processor 80 and includes correcting 302 the energy linearity of the strike events of event data for one of the calibration sources, identifying 304 sub-clusters of strike events from the event data, and determining 306 the energies of the sub-cluster by summing the energies of the corresponding strike events. Suitably, the calibration source includes a 511 keV energy peak. The ELC, the identification of sub-clusters, and the sub-cluster energy determinations are performed as described above in connection with the energy correction processor 68.

Using the determined energies of the sub-clusters, a first level pulse height spectrum is determined 308 for each pixel. A pulse height spectrum is a plot of counts versus energy. The pulse height spectrums of the pixels can be determined by, for each sub-cluster, adding a count for the energy of the sub-cluster to the pulse height spectrum corresponding to the sub-cluster. The pulse height spectrum corresponding to a sub-cluster is the pulse height spectrum of the pixel of the main strike event of the sub-cluster. As noted above, the main strike event is the strike event with the greatest energy.

Figure 12:
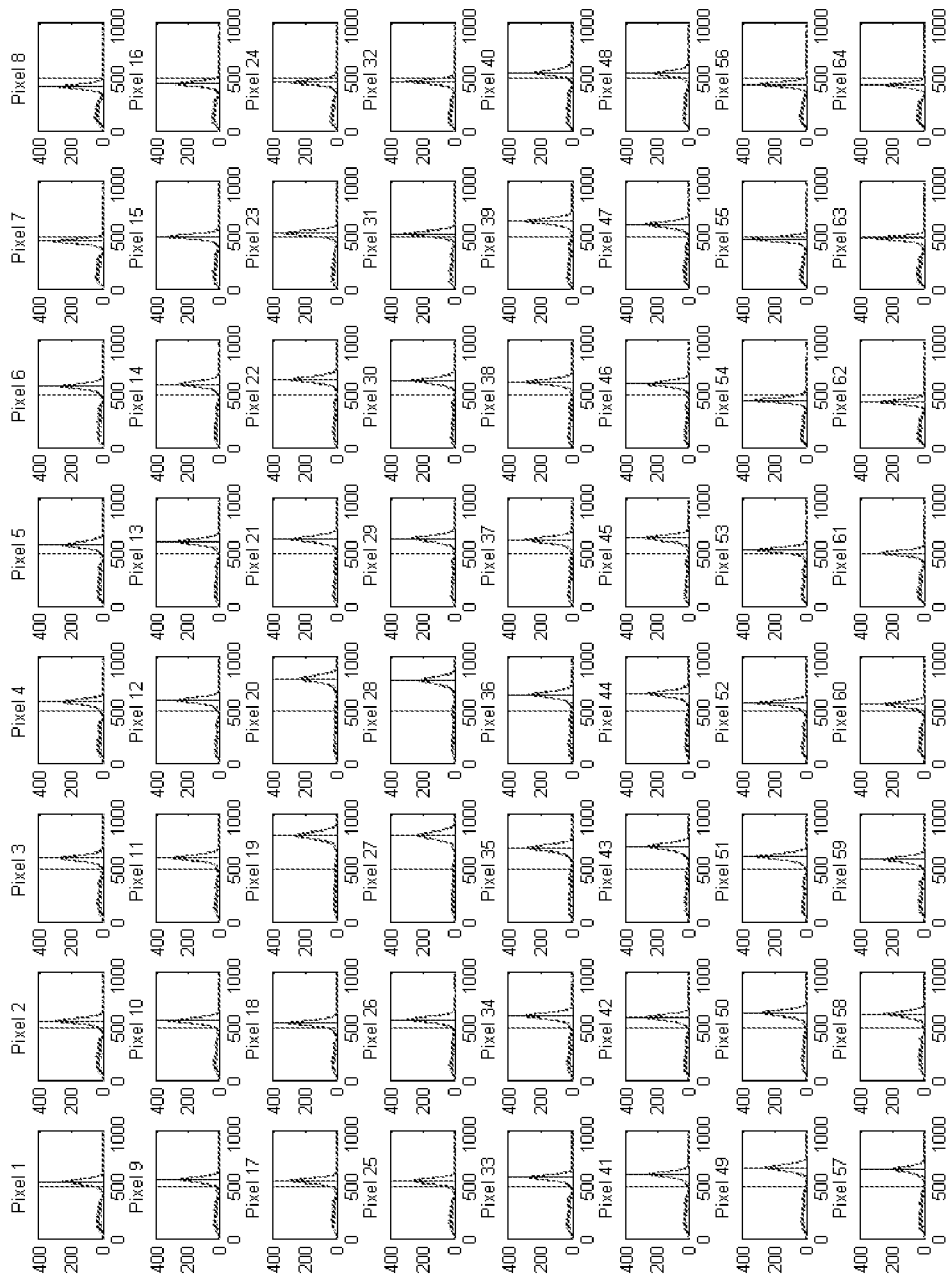
FIG. 12 illustrates the first level pulse height spectra for a plurality of pixels.

After determining the first level pulse height spectrum for the pixel, the pulse height spectrum is analyzed 310 to determine the measured energy peak of a known energy peak, such as 511 keV, of the calibration source. The measured energy peak of a known energy peak can be determined by searching for an energy peak proximate the known energy peak, such as within the range of +/−15 keV of the known energy peak. The first level scaling factor of the pixel is then determined 312 as the ratio of the measured energy peak to the known energy peak. Referring to FIG. 12, the first level pulse height spectra for a plurality of pixels are illustrated. Each pulse height spectrum includes an energy peak corresponding to a known energy peak. The measured energy peak and the ideal location of the known energy peak are marked on the pulse height spectra with vertical lines.

Figure 13:
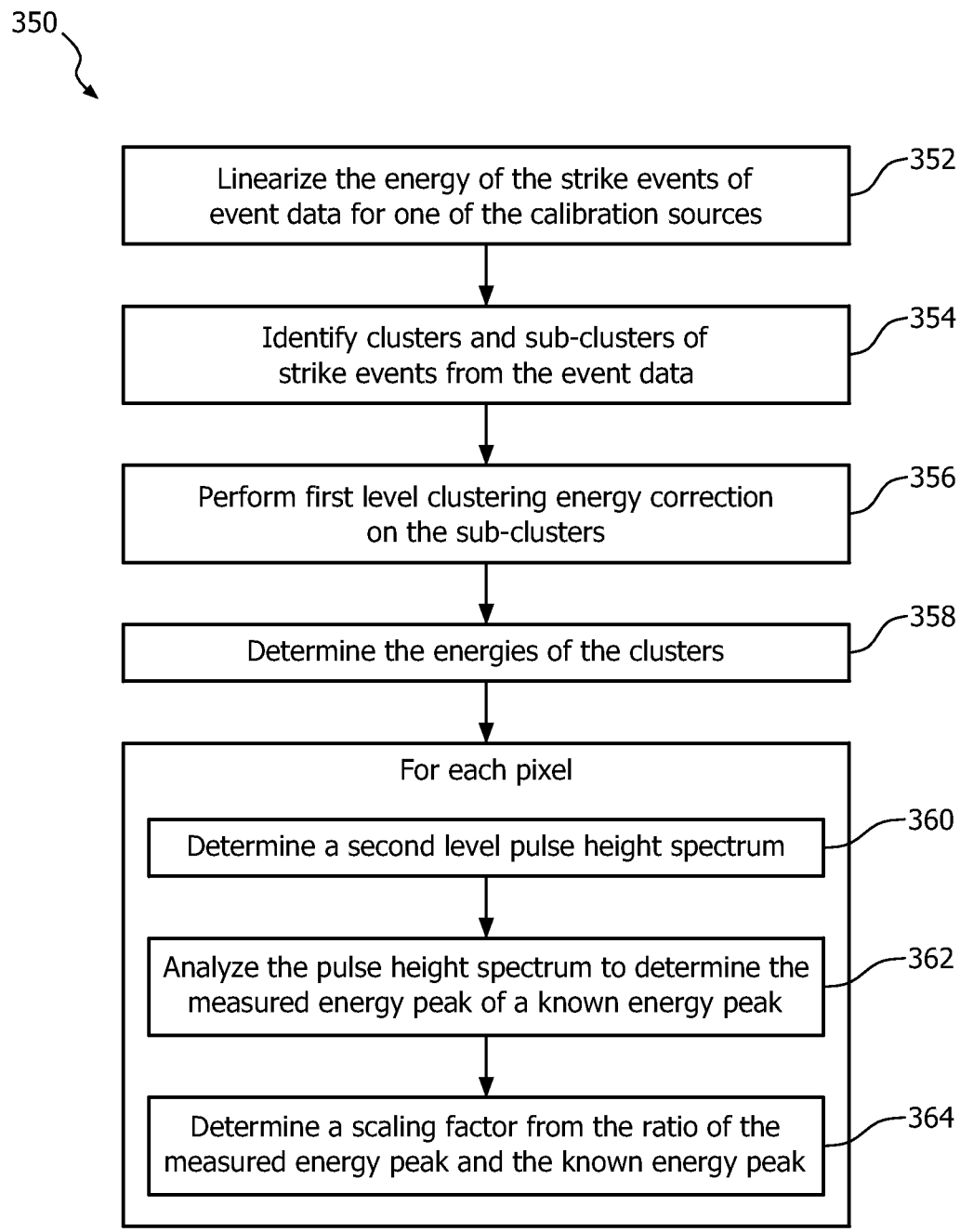
FIG. 13 illustrates a method for determining second level scaling factors.

With reference to FIG. 13, a method 350 for determining second level scaling factors is provided. The method 350 is performed by the calibration processor 80 and includes correcting 352 the energy linearity of the strike events of event data for one of the calibration sources, identifying 354 sub-clusters and clusters of strike events from the event data, performing 356 first level CEC on the sub-clusters, and determining 358 the energies of the clusters by summing the energies of the corresponding sub-clusters. Suitably, the calibration source includes a 511 keV energy peak. The ELC, the identification of clusters and sub-clusters, the first level CEC, and the determination of the energies of the clusters are performed as described above in connection with the energy correction processor 68.

Using the determined energies of the clusters, a second level pulse height spectrum is determined 360 for each pixel. The pulse height spectrums of the pixels can be determined by, for each cluster, adding a count for the energy of the cluster to the pulse height spectrum corresponding to the cluster. The pulse height spectrum corresponding to a cluster is the pulse height spectrum of the pixel of the main strike event of the sub-cluster.

Figure 14:
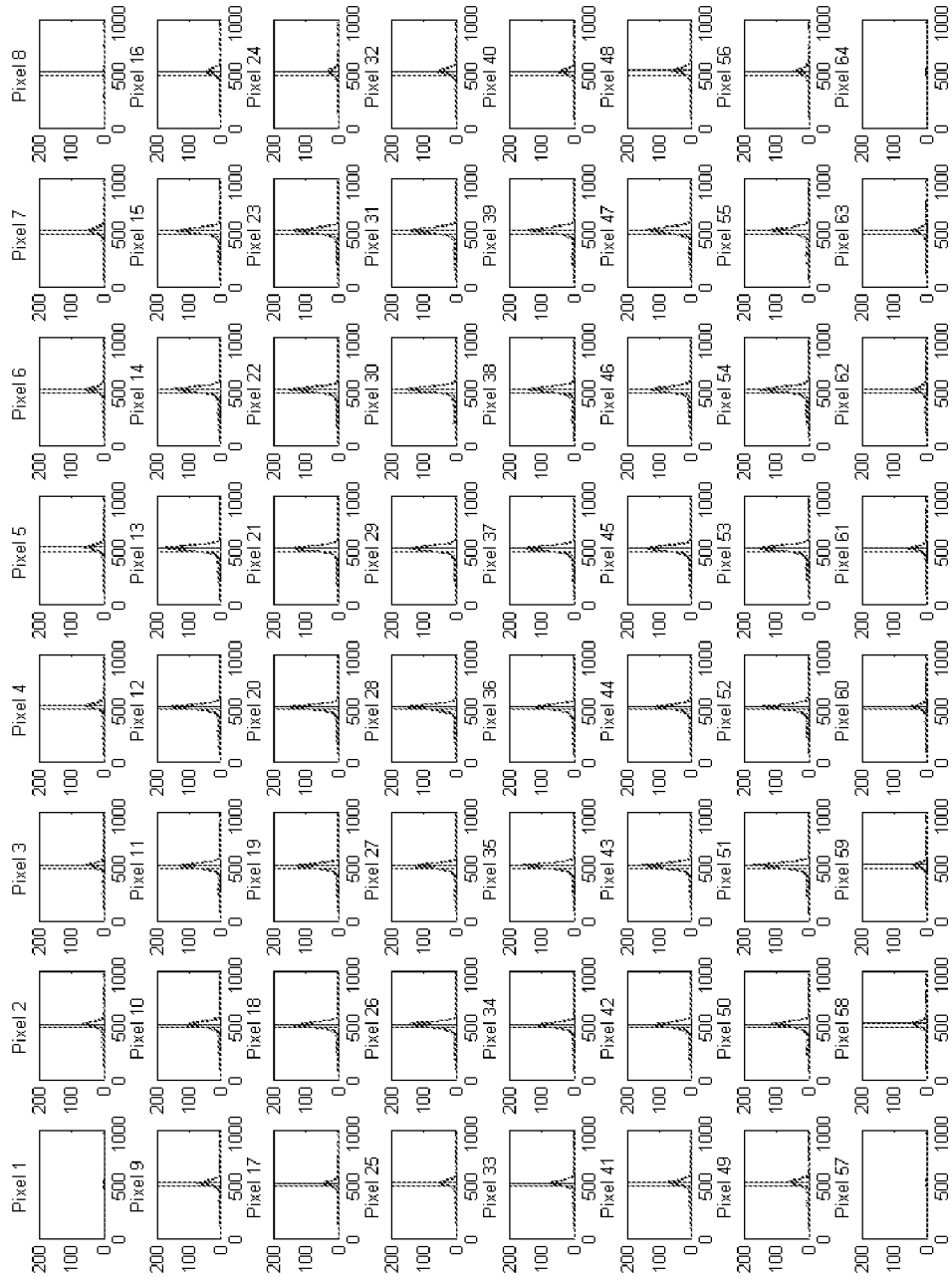
FIG. 14 illustrates the second level pulse height spectra for a plurality of pixels.

After determining the second level pulse height spectrum for the pixel, the pulse height spectrum is analyzed 362 to determine the measured energy peak of a known energy peak, such as 511 keV, of the calibration source. The measured energy peak of a known energy peak can be determined by searching for an energy peak proximate the known energy peak, such as within the range of +/−15 keV of the known energy peak. The second level scaling factor of the pixel is then determined 364 as the ratio of the measured energy peak to the known energy peak. Referring to FIG. 14, the second level pulse height spectra for a plurality of pixels are illustrated. Each pulse height spectrum includes an energy peak corresponding to a known energy peak. The measured energy peak and the ideal location of the known energy peak are marked on the pulse height spectra with vertical lines.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like; a controller includes at least one memory and at least one processor, the processor executing processor executable instructions on the memory; a user input device includes one or more of a mouse, a keyboard, a touch screen display, one or more buttons, one or more switches, one or more toggles, and the like; and a display device includes one or more of a LCD display, an LED display, a plasma display, a projection display, a touch screen display, and the like.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A system for energy correction of positron emission tomography (PET) event data, said system comprising:
   at least one processor programmed to:
      receive event data for a plurality of strike events corresponding to gamma events, each strike event detected by a pixel of one of a plurality of detector modules around an imaging volume and including an energy and a time, the detector modules detecting pairs of gamma photons from a region of interest of a patient in the imaging volume;
      linearize the energy of the strike events using an energy linearity correction model including one or more parameters to compensate for energy non-linearity of scattered strike events;
      identify clusters of the strike events based on the times of the strike events, wherein the strike events in each of the identified clusters are within a temporal window that corresponds to a single gamma event, each cluster including a plurality of strike events that correspond to a single gamma event;
      identify sub-clusters of the clusters based on the pixels corresponding to a subset of the strike events of each cluster;
      correct energies of the strike events of the sub-clusters using a first set of correction factors;
      correct energies of the strike events of each cluster of a plurality of sub-clusters using a second set of correction factors;
      reconstruct the energy corrected event data into an image of the region of interest of the patient; and
   a display device configured to display the image.

2. The system according to claim 1, wherein the linearization of the energy of the strike events includes for each of the strike events:
   determining parameter values corresponding to the parameters of the energy linearity correction model, the parameter values specific to the pixel corresponding to the strike event;
   update the parameters of the energy linearity correction model with the determined parameter values; and,
   correct the energy of the strike event using the updated energy linearity correction model.

3. The system according to claim 1, wherein the energy linearity correction model is:

$$P = -k_1 A \log_{10}\left(1 - \left(k_2 \frac{P_0}{A}\right)^{k_3}\right)$$

where $k_1$, $k_2$, and $k_3$ are the parameters, $P_0$ is the energy of the strike event, P is the corrected energy of the strike event, and A is the number of active cells.

4. The system according to claim 1, wherein the energy of the strike events is linearized in a range between 100 keV and 500 keV.

5. The system according to claim 1, wherein each of the identified clusters corresponds to a single one of the gamma events and includes the strike events corresponding to the gamma event.

6. The system according to claim 1, wherein the identification of the sub-clusters includes:
   grouping pixels of one or more detector modules corresponding to the strike events into a plurality of non-overlapping blocks, the pixels of the detector modules including the pixels corresponding to the strike events;
   wherein each of the sub-clusters corresponds to a single one of the non-overlapping blocks and includes strike events of the corresponding cluster which correspond to the single non-overlapping block.

7. The system according to claim 1, wherein each correction factor of the first set of correction factors and/or the second set of correction factors is one or more of:
   specific to a pixel of a detector module of the strike events; and,
   a ratio of a known peak energy and a corresponding measured peak energy.

8. The system according to claim 1, wherein the correction of the sub-clusters includes:
   for each of the sub-clusters:
      determining energy of the sub-cluster by summing energies of one or more strike events of the sub-cluster;
      determining a main strike event of the sub-cluster, the main strike event including the greatest energy of all the strike events of the sub-cluster;
      determining a correction factor using the first set of correction factors, the correction factor being specific to a pixel corresponding to the main strike event; and,
      applying the correction factor to the energy of the sub-cluster.

9. The system according to claim 1, wherein the correction of the clusters including a plurality of sub-clusters includes:
   for each of the clusters including a plurality of sub-clusters:
      determining energy of the cluster by summing energies of one or more sub-clusters of the cluster;
      determining a main strike event of the cluster, the main strike event including the greatest energy of all strike events of the cluster;
      determining a correction factor using the second set of correction factors, the correction factor being specific to a pixel corresponding to the main strike event; and,
      applying the correction factor to the energy of the cluster.

10. A system for energy correction of positron emission tomography (PET) event data, said system comprising:
    a plurality of solid state detector modules detecting gamma photons from a region of interest of a patient and generating the event data in response to the gamma photons;
    at least one energy correction processor programmed to:
       receive event data for a plurality of strike events corresponding to gamma events, each strike event detected by a pixel of a detector module and including an energy and a time,
       linearize the energy of the strike events using an energy linearity correction model including one or more parameters,
       identify clusters of the strike events based on the times of the strike events,
       identify sub-clusters of the clusters based on the pixels corresponding to the strike events of the clusters,
       correct energies of the sub-clusters using a first set of correction factors, and correct energies of clusters including a plurality of sub-clusters using a second set of correction factors; and, a reconstruction processor processing the event data as corrected by the energy correction processor to create an image representation of the region of interest.

11. The system according to claim 1, wherein each gamma event is 511 keV and further including:

a calibration processor determining parameter values for the energy linearity correction model using event data for a plurality of calibration sources, including Co57 and Na22.

12. A method for energy correction of positron emission tomography (PET) event data, said method comprising:

receiving by at least one processor event data for a plurality of strike events corresponding to 511 keV gamma photons from a region of interest of a patient disposed in an imaging volume of a PET scanner, each of the strike events being detected by a pixel of a detector module and including an energy and a time, individual ones of the 511 keV gamma photons being scattered in a scintillation crystal of a first detector, the scattering causing a first portion of the 511 keV gamma photon to be converted to light in a first strike event and a remainder of the gamma photon to travel into a scintillation crystal of an adjoining detector converting a second portion of the gamma photon to light in a second strike event;

linearizing by the at least one processor the energy of the strike events of the event data using an energy linearity correction model including one or more parameters;

identifying by the at least one processor clusters of the strike events based on the times of the strike events, each cluster corresponding to the strike events caused by a single 511 keV gamma photon;

identifying by the at least one processor sub-clusters of the clusters based on the pixels corresponding to the strike events of the clusters;

correcting by the at least one processor energies of the strike events of the sub-clusters of the event data using a first set of correction factors; and, further correcting by the at least one processor energies of the strike events of each cluster including a plurality of sub-clusters of the event data using a second set of correction factors;

reconstructing the linearized and corrected event data into an image depicting the region of interest of the patient; and, displaying the image with a display device.

13. The method according to claim 12, wherein the energy linearity correction model is:

$$P = -k_1 A \log_{10}\left(1 - \left(k_2 \frac{P_0}{A}\right)^{k_3}\right)$$

where $k_1$, $k_2$, and $k_3$ are the parameters, $P_0$ is the energy of the strike event, P is the corrected energy of the strike event, and A is the number of active cells.

14. The method according to claim 12, wherein the identification of the sub-clusters includes:

grouping pixels of one or more detector modules corresponding to the strike events into a plurality of non-overlapping blocks, the pixels of the detector modules including the pixels corresponding to the strike events;

wherein each of the sub-clusters corresponds to a single one of the non-overlapping blocks and includes strike events of the corresponding cluster which correspond to the single non-overlapping block.

15. The method according to claim 12, wherein each correction factor of the first set of correction factors and/or the second set of correction factors is one or more of:

specific to a pixel of a detector module of the strike events; and, a ratio of a known peak energy and a corresponding measured peak energy.

16. The method according to claim 12, wherein the correction of the sub-clusters includes:

for each of the sub-clusters:

determining energy of the sub-cluster by summing energies of one or more strike events of the sub-cluster;

determining a main strike event of the sub-cluster, the main strike event including the greatest energy of all the strike events of the sub-cluster;

determining a correction factor using the first set of correction factors, the correction factor being specific to a pixel corresponding to the main strike event; and, applying the correction factor to the energy of the sub-cluster.

17. The method according to claim 12, wherein the correction of the clusters including a plurality of sub-clusters includes:

for each of the clusters including a plurality of sub-clusters:

determining energy of the cluster by summing energies of one or more sub-clusters of the cluster;

determining a main strike event of the cluster, the main strike event including the greatest energy of all strike events of the cluster;

determining a correction factor using the second set of correction factors, the correction factor being specific to a pixel corresponding to the main strike event; and, applying the correction factor to the energy of the cluster.

18. The method according to claim 12, further including:

determining by the at least one processor parameter values for the energy linearity correction model using event data for a plurality of calibration sources, including Co57 and Na22.

19. A positron emission tomography (PET) system with energy correction of positron emission tomography (PET) event data, said system comprising:

a ring of gamma photon detectors, each gamma photon detector including a scintillator which converts gamma energy into light scintillations and light radiation sensitive elements which convert each light scintillation into event data, the ring of gamma photon detectors encircling an imaging volume configured to receive 511 keV gamma photons from a region of interest of a patient, each 511 keV photon striking a scintillator being a gamma event;

wherein each 511 keV gamma photon strikes a first scintillation crystal causing a first scintillation and is scattered into a second scintillation crystal causing a second scintillation, the output from each light radiation sensitive element in response to a scintillation being a strike event, the plurality of strike events corresponding to a single 511 keV gamma event being a cluster;

at least one processor programmed to:
   receive the event data for a plurality of the strike events corresponding to each gamma event, each strike event detected by a pixel of a detector module and including an energy and a time;
   linearize the energy of the strike events between 100 keV and 500 keV using an energy linearity correction model;
   identify the clusters of the strike events based on the times of the strike events;
   correct energies of the strike events of sub-clusters of the identified clusters using a first level of clustering energy correction factors;
   correct the energies of the strike events corresponding to each cluster using second level clustering energy correction factors;
   combine the corrected energies of the strike events of a common cluster;
   compare the combined corrected energies with a preselected threshold; and
   reconstruct the clusters with combined energies exceeding the preselected threshold into a PET image of the region of interest.

20. The system according to claim 19, further including a display device configured to display the PET image.

* * * * *